US010732369B2

(12) United States Patent
Holmberg et al.

(10) Patent No.: US 10,732,369 B2
(45) Date of Patent: Aug. 4, 2020

(54) TELECOMMUNICATIONS ENCLOSURE

(71) Applicant: CommScope Technologies LLC, Hickory, NC (US)

(72) Inventors: Matthew J. Holmberg, Le Center, MN (US); James J. Solheid, Lakeville, MN (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 16/420,717

(22) Filed: May 23, 2019

(65) Prior Publication Data

US 2019/0369346 A1 Dec. 5, 2019

Related U.S. Application Data

(63) Continuation of application No. 15/735,781, filed as application No. PCT/US2016/037025 on Jun. 10, 2016, now Pat. No. 10,416,404.

(60) Provisional application No. 62/175,047, filed on Jun. 12, 2015, provisional application No. 62/196,119, filed on Jul. 23, 2015.

(51) Int. Cl.
*G02B 6/44* (2006.01)
*G02B 6/38* (2006.01)
*H04Q 11/00* (2006.01)

(52) U.S. Cl.
CPC ......... *G02B 6/4446* (2013.01); *G02B 6/3897* (2013.01); *G02B 6/445* (2013.01); *G02B 6/4453* (2013.01); *G02B 6/4455* (2013.01); *G02B 6/4478* (2013.01); *H04Q 11/0003* (2013.01); *G02B 6/4444* (2013.01); *H04Q 2201/804* (2013.01)

(58) Field of Classification Search
None
See application file for complete search history.

(56) References Cited

U.S. PATENT DOCUMENTS

| 5,497,444 A | 3/1996 | Wheeler |
| 6,591,051 B2 | 7/2003 | Solheid et al. |
| 6,665,484 B2 | 12/2003 | Douglas et al. |
| 6,771,871 B2 | 8/2004 | Krampotich et al. |

(Continued)

FOREIGN PATENT DOCUMENTS

WO    2009/131895 A1    10/2009

OTHER PUBLICATIONS

International Search Report and Written Opinion of the International Searching Authority for corresponding International Patent Application No. PCT/US2016/037025 dated Sep. 12, 2016, 15 pages.

(Continued)

*Primary Examiner* — Jerry Rahll
(74) *Attorney, Agent, or Firm* — Merchant & Gould P.C.

(57) ABSTRACT

This disclosure is related to a fiber optic distribution system including a telecommunications enclosure. In one aspect, the telecommunications enclosure can include a main body and a cover that together define an interior cavity. A first tray and a second tray can be mounted within the interior cavity. The first tray can be configured to hold a fiber optic splitter and to include cable management features. The second tray can be configured with a termination feature for connecting cables extending from the splitter to cables that can be distributed to individual locations remote from the enclosure, such as individual dwelling units.

20 Claims, 19 Drawing Sheets

(56) References Cited

U.S. PATENT DOCUMENTS

| | | |
|---|---|---|
| 2008/0285933 A1 | 11/2008 | Vogel et al. |
| 2010/0183274 A1 | 7/2010 | Brunet et al. |
| 2010/0329623 A1 | 12/2010 | Smith et al. |
| 2010/0329624 A1 | 12/2010 | Zhou et al. |
| 2011/0222829 A1 | 9/2011 | Loeffelholz et al. |

OTHER PUBLICATIONS

Extended EP Search Report and Written Opinion corresponding to EP 16808444.0 dated Jan. 21, 2019.

TELECOMMUNICATIONS ENCLOSURE

CROSS-REFERENCE TO RELATED APPLICATIONS

This application is a Continuation of U.S. patent application Ser. No. 15/735,781, filed on Dec. 12, 2017, now U.S. Pat No. 10,416,404, which is a National Stage Application of PCT/US2016/037025, filed on Jun. 10, 2016, which claims the benefit of U.S. Patent Application Ser. No. 62/196,119, filed on Jul. 23, 2015 and claims the benefit of U.S. Patent Application Ser. No. 62/175,047, filed on Jun. 12, 2015, the disclosures of which are incorporated herein by reference in their entireties. To the extent appropriate, a claim of priority is made to each of the above disclosed applications.

FIELD OF THE INVENTION

The present invention relates to telecommunications enclosures and fiber optic distribution systems.

BACKGROUND

Numerous telecommunications enclosures exist today and are used in various applications. One such application is for use in fiber distribution to multiple dwelling units (MDU's). In many applications, telecommunications enclosures are configured to house various telecommunications components in a single main compartment.

SUMMARY

This disclosure is related to a fiber optic distribution system including a telecommunications enclosure. In one aspect the fiber optic distribution system can include a first optical cable including at least one first optical fiber, a plurality of second optical cables each of which includes at least one second optical fiber, and a plurality of third optical cables each of which includes at least one third optical fiber. The fiber optic distribution system may also include an optical splitter connected to the first and second optical cables. The optical splitter can be configured to split an optical signal from the first optical fiber to the plurality of second optical fibers.

The telecommunications enclosure can include a main body and a cover that together define an interior cavity. In one aspect, one of the main body and the cover includes a first opening for receiving the first optical cable into the interior cavity and includes a second opening for allowing the plurality of third cables to exit the interior cavity. The enclosure can also include a first layer or tray mountable within the interior cavity. The first tray can be provided with a wall structure for retaining the optical splitter and a plurality of cable management clips for retaining the plurality of second cables extending from the optical splitter. The enclosure can also include a second layer or tray mountable to the first tray. The second tray can include an aperture for allowing passage of the plurality of second cables from the first tray into the second tray, a termination location for placing the second optical fibers in optical communication with third optical fibers, and a cable routing passageway for guiding the plurality of third cables from the termination location to the second opening. Cable slack storage systems are provided within the enclosure.

BRIEF DESCRIPTION OF THE DRAWINGS

The accompanying drawings, which are incorporated in and constitute a part of the description, illustrate several aspects of the present disclosure. A brief description of the drawings is as follows.

DETAILED DESCRIPTION

Figure 1:
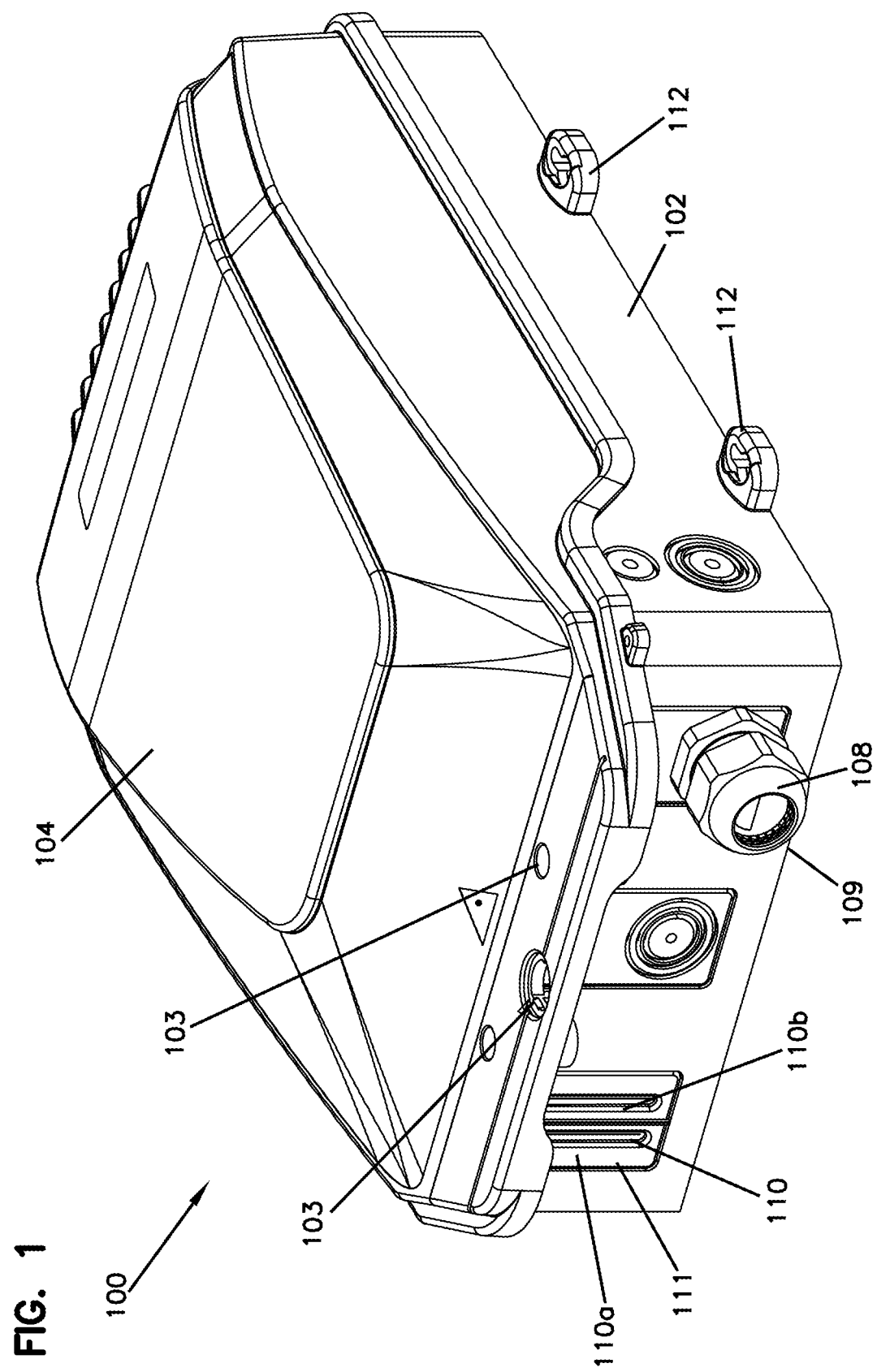
FIG. 1 is a perspective view of a telecommunications enclosure having features and aspects in accordance with the present disclosure.
Figure 2:
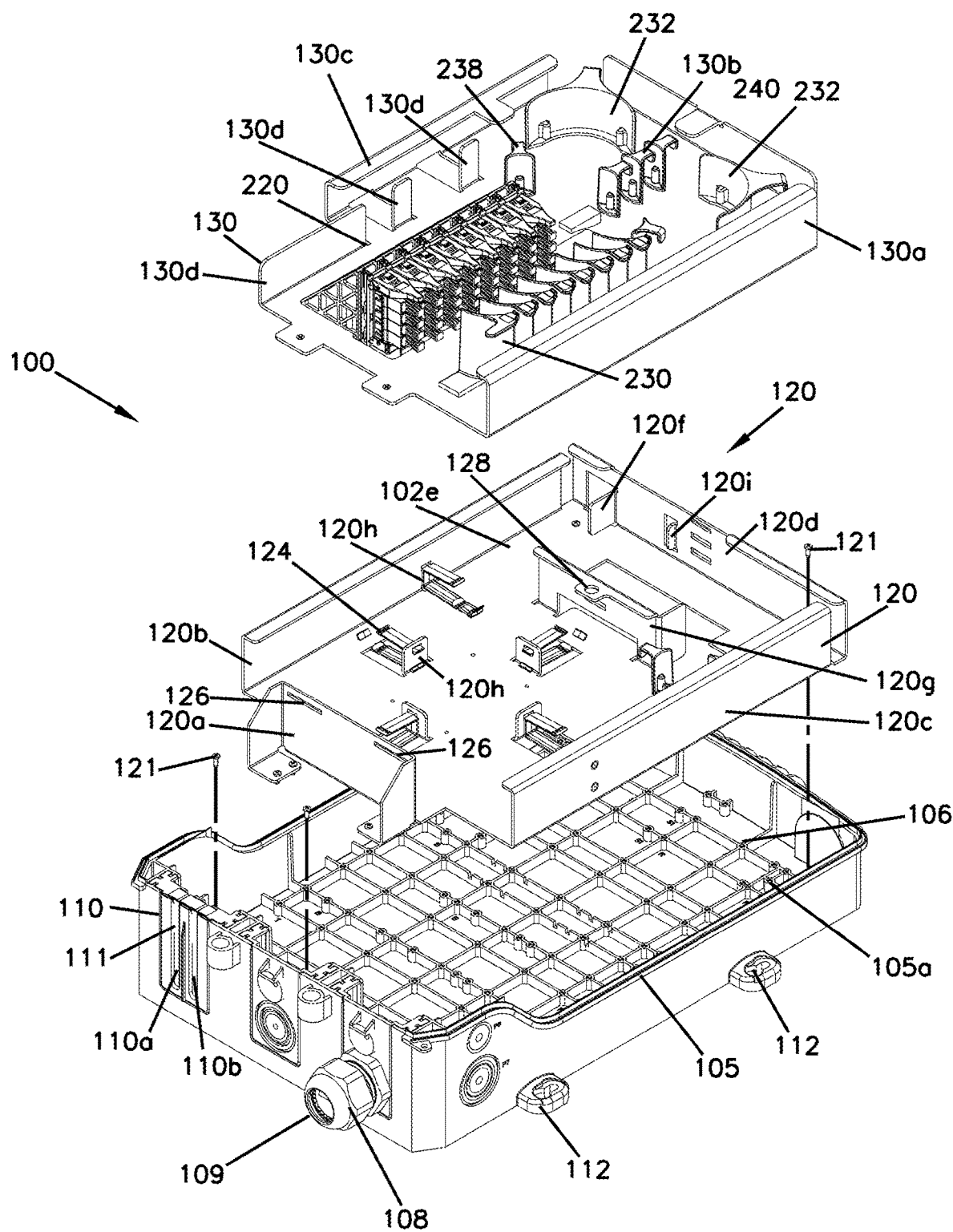
FIG. 2 is a an exploded perspective view of the telecommunications enclosure shown in FIG. 1 including a main body, a first tray, and a second tray.
Figure 3:
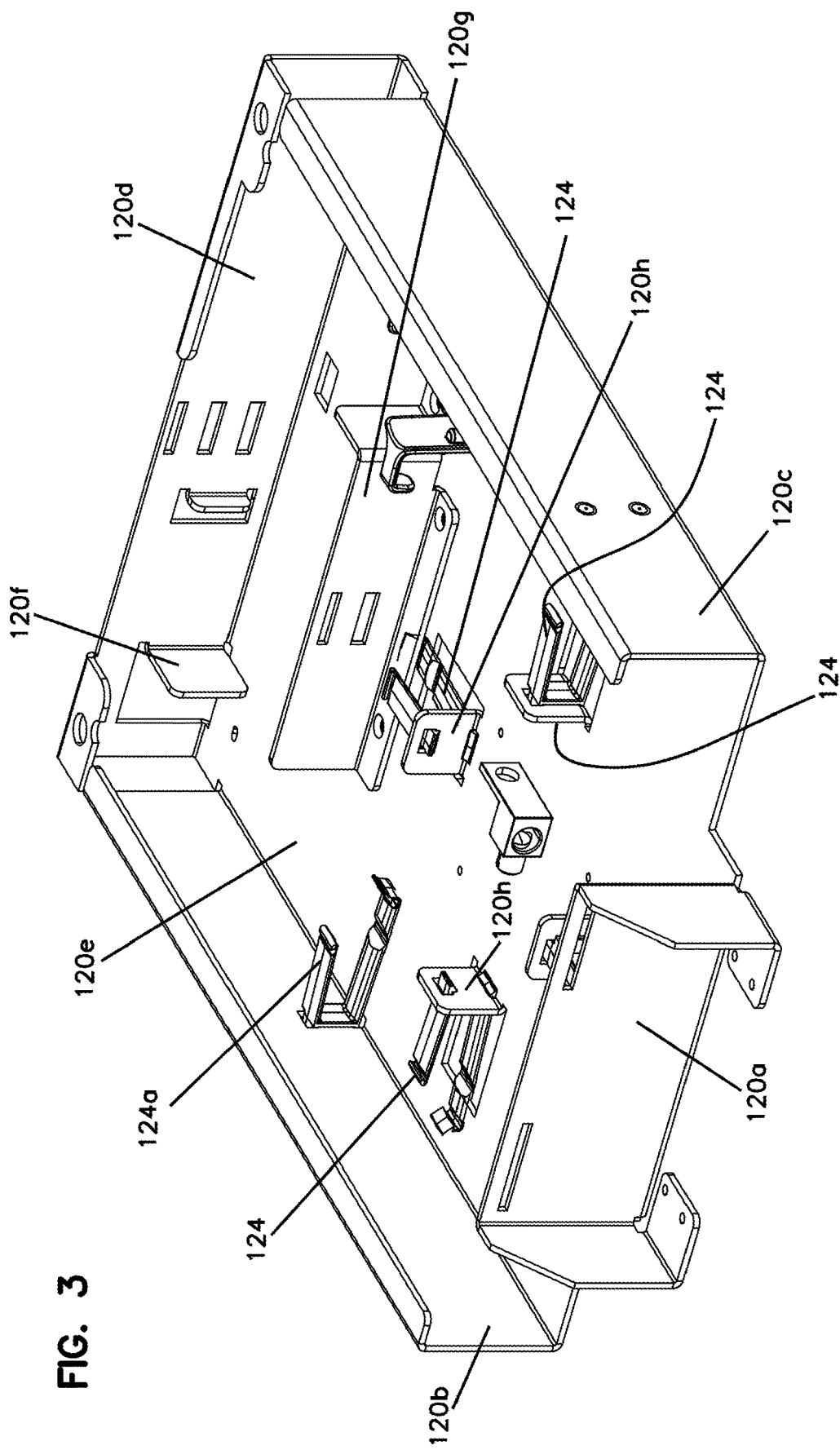
FIG. 3 is a perspective view of the first tray of the telecommunications enclosure shown in FIG. 1.
Figure 4:
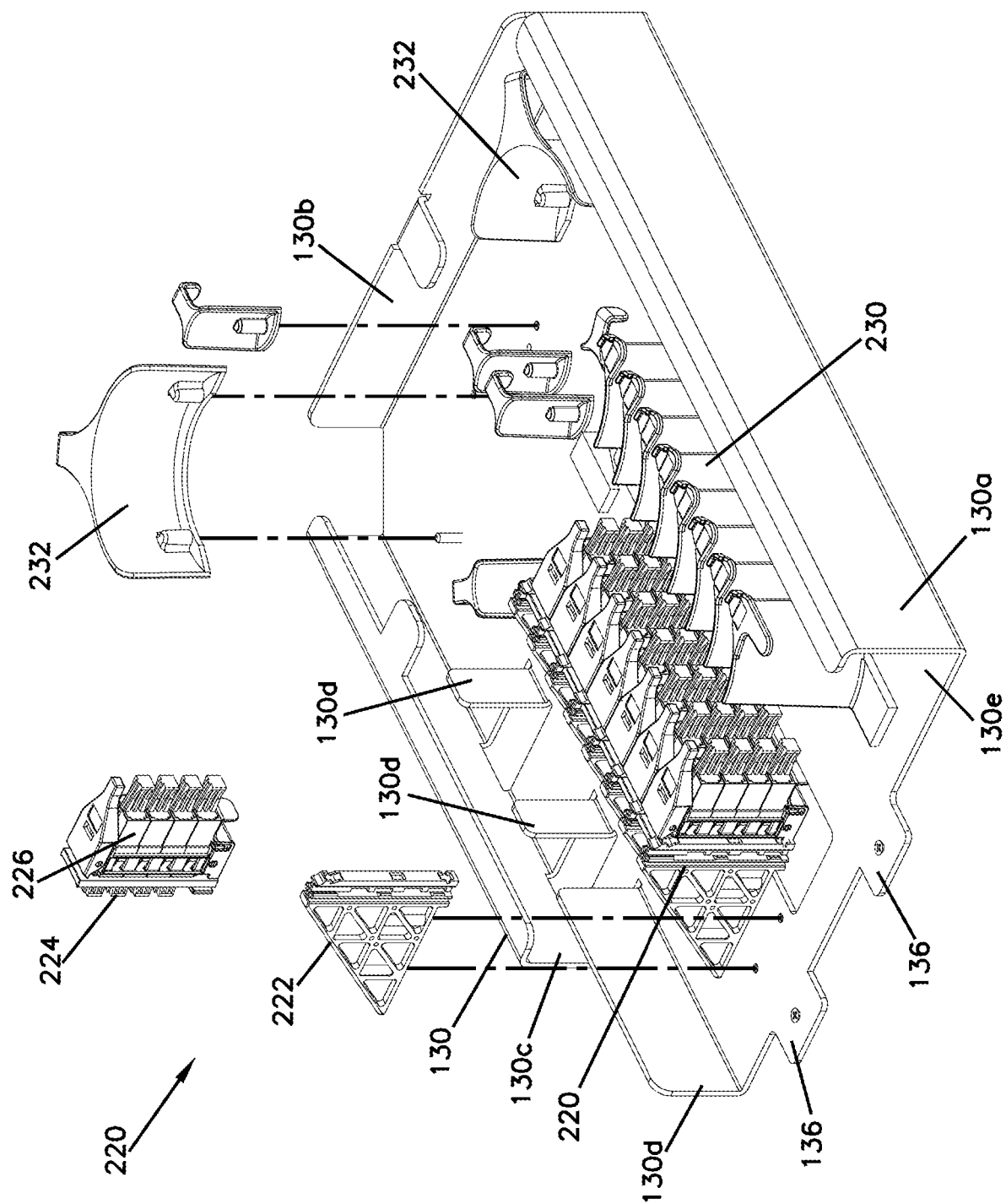
FIG. 4 is a perspective view of the second tray of the telecommunications enclosure shown in FIG. 1.
Figure 5:
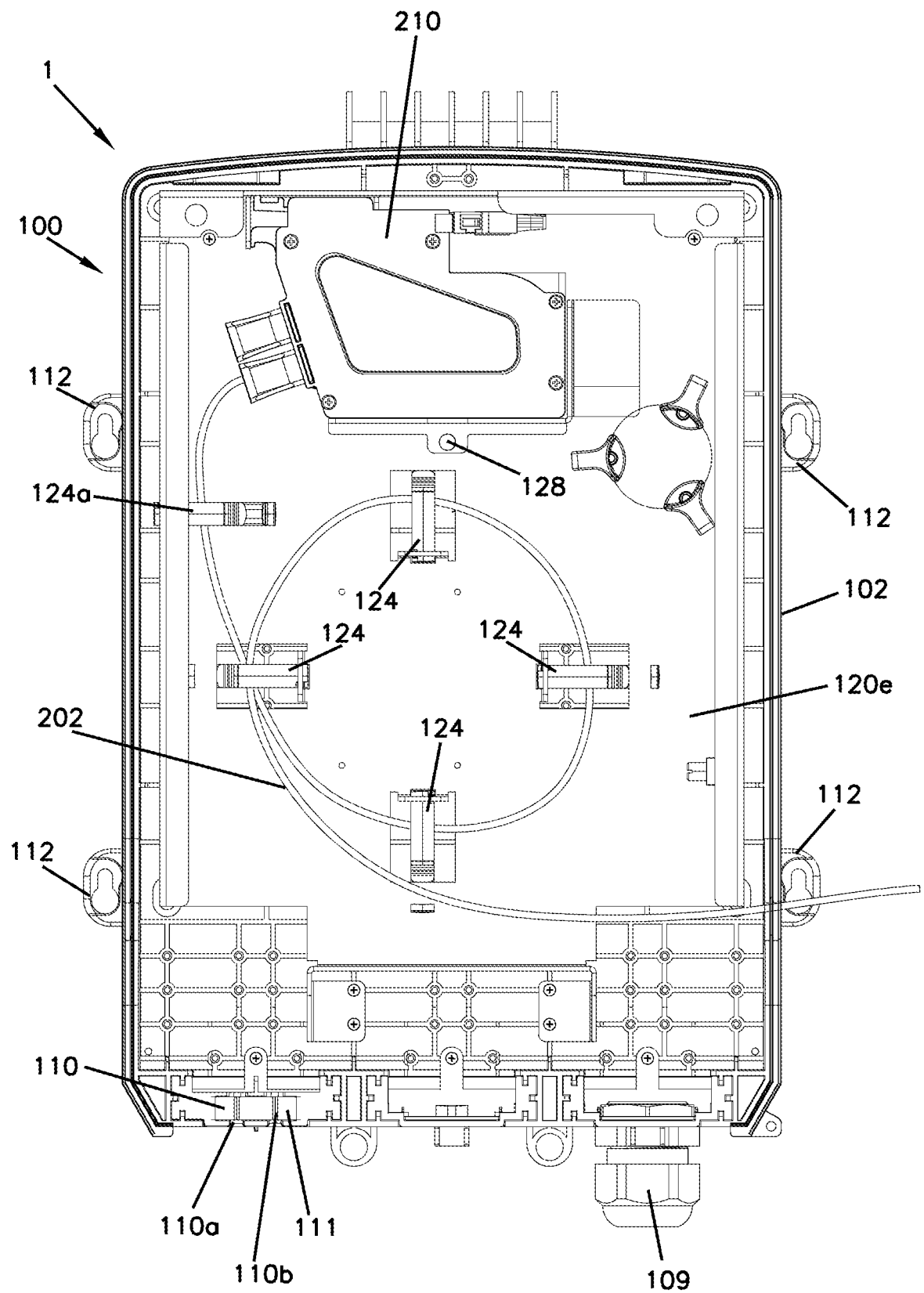
FIG. 5 is a top view of the telecommunications enclosure shown in FIG. 1 with the cover and second tray removed to show the first tray.
Figure 6:
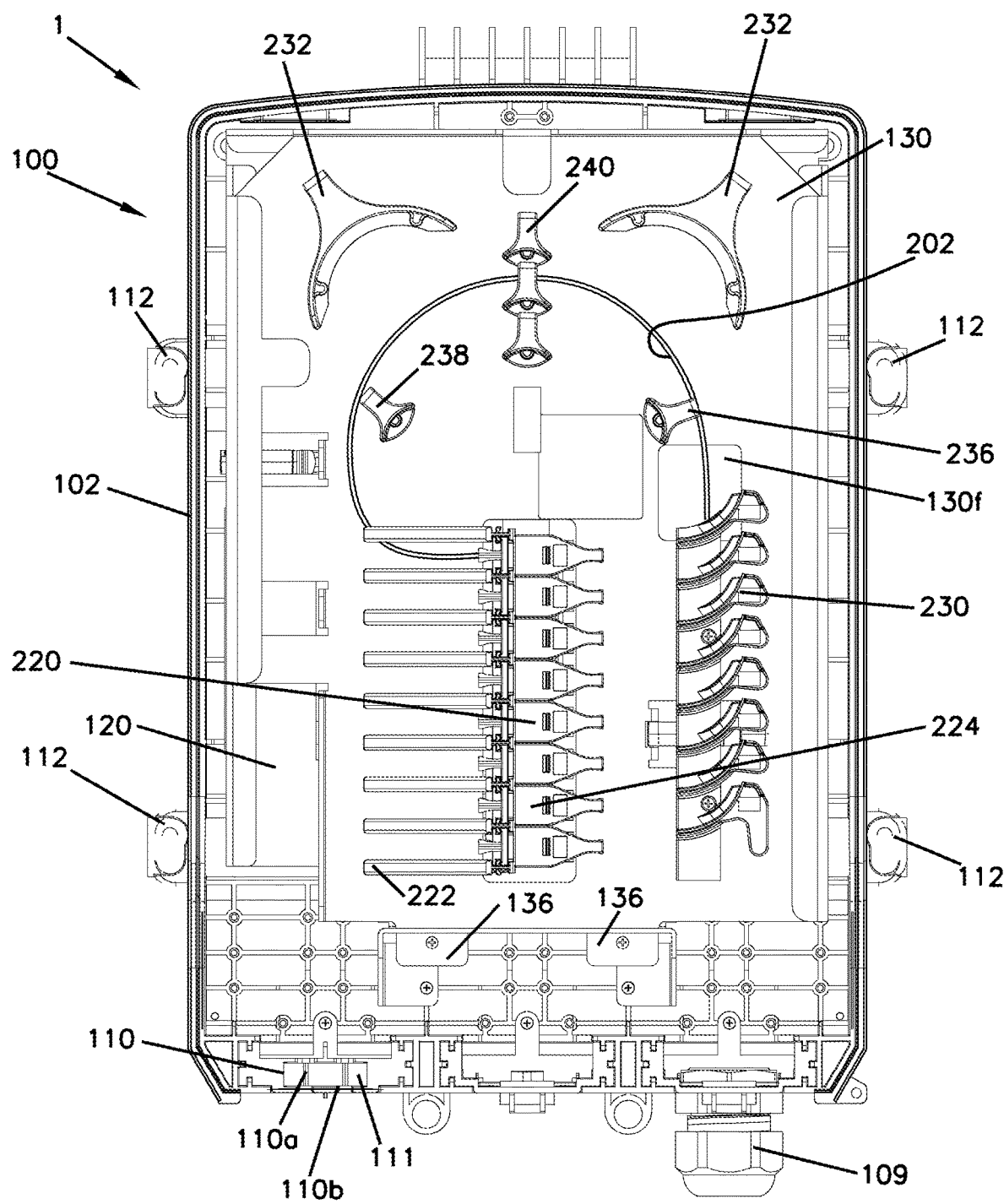
FIG. 6 is a top view of the telecommunications enclosure shown in FIG. 1 with the cover removed to show the second tray.

Reference will now be made in detail to exemplary aspects of the present disclosure that are illustrated in the accompanying drawings. Whenever possible, the same reference numbers will be used throughout the drawings to refer.

As presented at FIGS. 1-12, a telecommunications enclosure 100 that is part of a fiber distribution system 1 is shown. FIGS. 1-7 generally emphasize features of the enclosure 100 while FIGS. 8-12 show the enclosure 100 with additional telecommunications components (e.g. adapters, splitter, cables, etc.) to form the fiber distribution system 1. In one aspect, the telecommunications enclosure 100 can be configured as a building distribution wall box that houses an optical splitter in an outdoor or outdoor environment. The enclosure 100 can be utilized as a final distribution point in a "Fiber to the X (FTTX)" network, for example in a network where individual fibers from the enclosure 100 are routed to individual living spaces in a multiple dwelling unit (MDU).

As shown, the enclosure 100 includes a main body 102 and a cover 104 that together define an interior cavity 106. The cover 104 is movable with respect to the main body 102 and can be completely removable from the main body 102 and/or pivotally attached to the main body 102. In the embodiment shown, the cover 104 can be secured to the main body 102 by a pair of captive screws 103. A weather seal 105 may be provided on the main body 102 or the cover 104 to provide a weather resistant seal between the main body 102 and cover 104. As shown, a continuous weather seal 105 is provided within a channel 105a defined in the main body 102.

In one aspect, the enclosure includes a first opening 108 for receiving an incoming feeder cable 200 and a second opening 110 for allowing distribution cables or patch cords 204 to exit the enclosure 100. In the embodiment shown, the first and second openings are shown as being provided in the main body 102.

The first opening 108 is provided with a threaded compression fitting 109 that is configured to fully secure one or more feeder cables 200 in a fixed position and to provide a weather tight seal around the feeder cable 200. The second opening 110 is constructed to have a first slot 110a and a second slot 110b that extend to the top edge of the enclosure main body 102. Each of the slots is defined by an elastic (i.e. foam) material 111 secured by channels 113 in the main body 102. The foam material frictionally retains the cables 204 in a generally fixed position and provides a seal against weather and debris. This construction allows for patch cords and cables 204 to be individually slid down into the slots 110a, 110b when the cover 104 is open or removed and to be secured into the slots 110a, 110b when the cover 104 is secured to the main body 102. The enclosure 100 may also be provided with mounting lugs 112 such that the enclosure 112 can be mounted to a surface 113, such as a wall, by mechanical fasteners 114, such as screws.

The main body 102 and cover 104 can be formed from a variety of materials. In one example, the main body 102 and cover 104 are molded from a plastic material. In one example, the materials used for the enclosure 100 and cables 200, 202, 204, including the main body 102 and cover 104 are provided to be fire retardant and/or have a "low smoke zero halogen" (LSZH) rating.

As presented, the enclosure 100 may include a first tray 120 mountable within the interior cavity 106 of the enclosure and a second tray 130 mountable to the first tray 120.

The first and second trays 120, 130 may be formed of any suitable material. In the embodiment shown, the first and second trays 120, 130 are formed from an initially flat sheet of steel that is first cut to have the appropriate shape and openings and is then folded in to the desired form. The first tray 120 can be secured to the main body 102 via fasteners, such as screws 121. The second tray 130 can be secured to the second tray via fasteners or a latch mechanism 131 that engages with a corresponding aperture 128 associated with the first tray 120. In an alternative embodiment, the back wall of the enclosure main body 102 may be utilized as the first layer instead of having a separate tray.

In one aspect, the first tray 120 is formed to have sidewalls 120a, 120b, 120c, and 120d, each of which extends outwardly from a back wall 120e. The first tray 120 is additionally provided with a wall structure 122 defined by walls 120d, 120f, 120g, and 120i. The wall structure 122 is for retaining an optical splitter 210 within the first tray 120. The optical splitter 210 may be further secured within the first tray 120 with a strap and/or fasteners, such as screws. In one aspect, the optical splitter 210 can be a connectorized type splitter for splitting an optical signal from the optical fiber of the feed cable 200 to a plurality of second optical fibers associated with splitter cables 202. The optical splitter 210 can be configured to split the feeder signal into, for example, 16 or 32 splitter cables 202 which are ultimately connected to output cables 204 for connection to individual subscribers. In the embodiment shown, a single splitter 210 is provided that outputs to 32 output cables 202. Other exemplary configurations include a single splitter with 16 outputs (i.e. 1×16) and a two splitter arrangement wherein each splitter has 16 outputs (i.e. 2×1×16) The wall structure 122 can be configured to retain multiple optical splitters 210, such as two or three optical splitters 210 in a stacked configuration. The splitter 210 connects to a connectorized input cable 200 through an adapter.

The first tray 120 additionally includes a plurality of walls 120h that are for supporting cable management clips 124. The cable management clips 124 are for securing the cables 202 leading from the optical splitter 210 and are arranged such that the cables 202 can be looped in a circular fashion to take up any necessary slack in the cables 202. With this design, standard length cables 202 may be utilized and the need for custom cable lengths can be avoided. As shown, the cable management clips 124 are movable between an open position in which the cables can be installed and removed to and from the clips 124 and a closed position in which the cables 202 are securely held within the clips 124. The clips 124 can also be arranged to provide bend radius limiting protection for the cables 202. For example, clip 124a is located to provide such protection for the cables 202 proximate the location where the cables 202 extend from the optical splitter 210. Examples of clips suitable for the disclosed enclosure 100 and system 1 are described and shown in U.S. Pat. Nos. 6,665,484 and 6,771,871, the entireties of which are each incorporated by reference herein.

Figure 7:
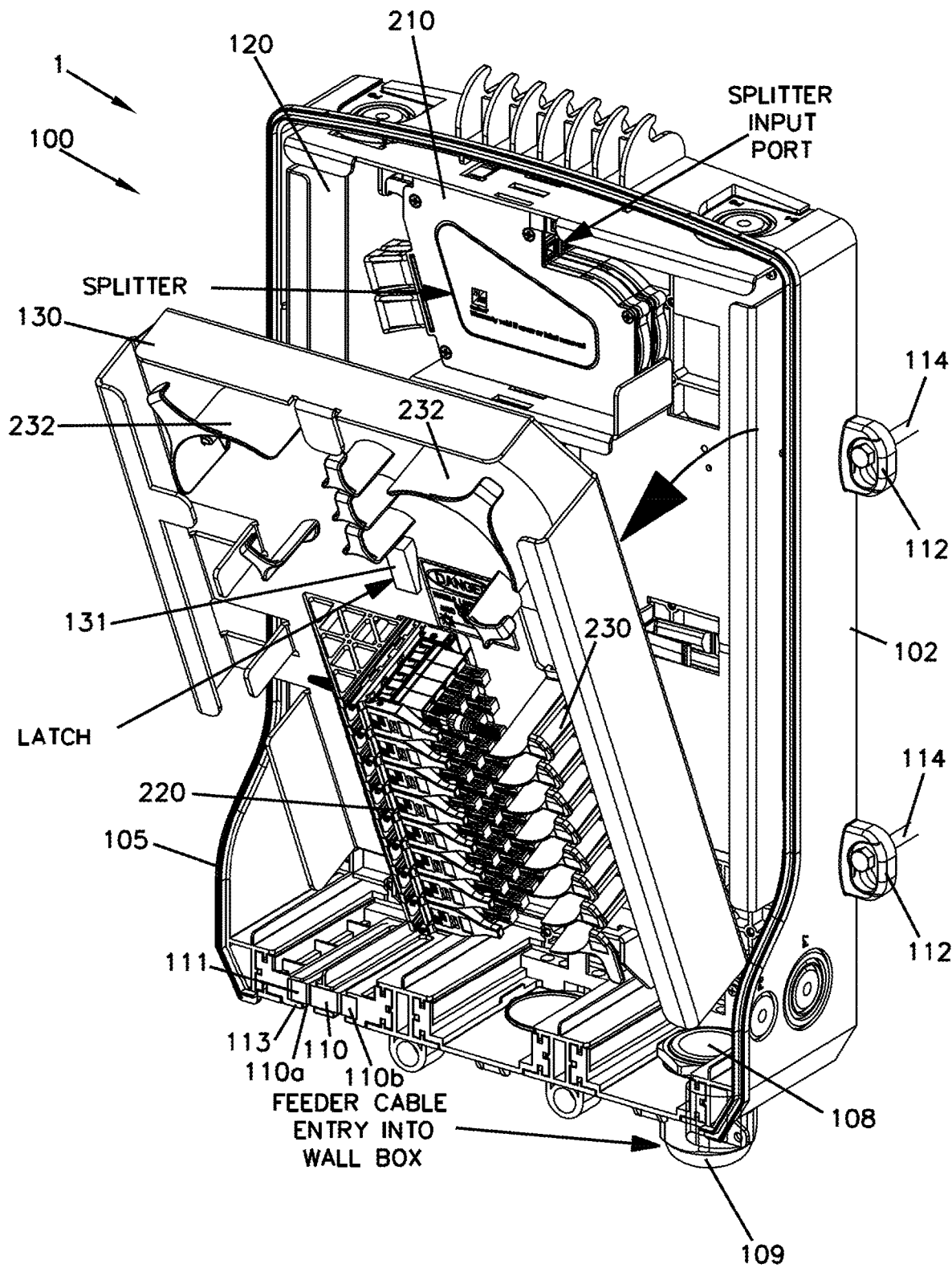
FIG. 7 is a perspective view of the telecommunications enclosure shown in FIG. 1 with the cover removed from the telecommunications enclosure and with the second tray in an outwardly pivoted position.
Figure 8:
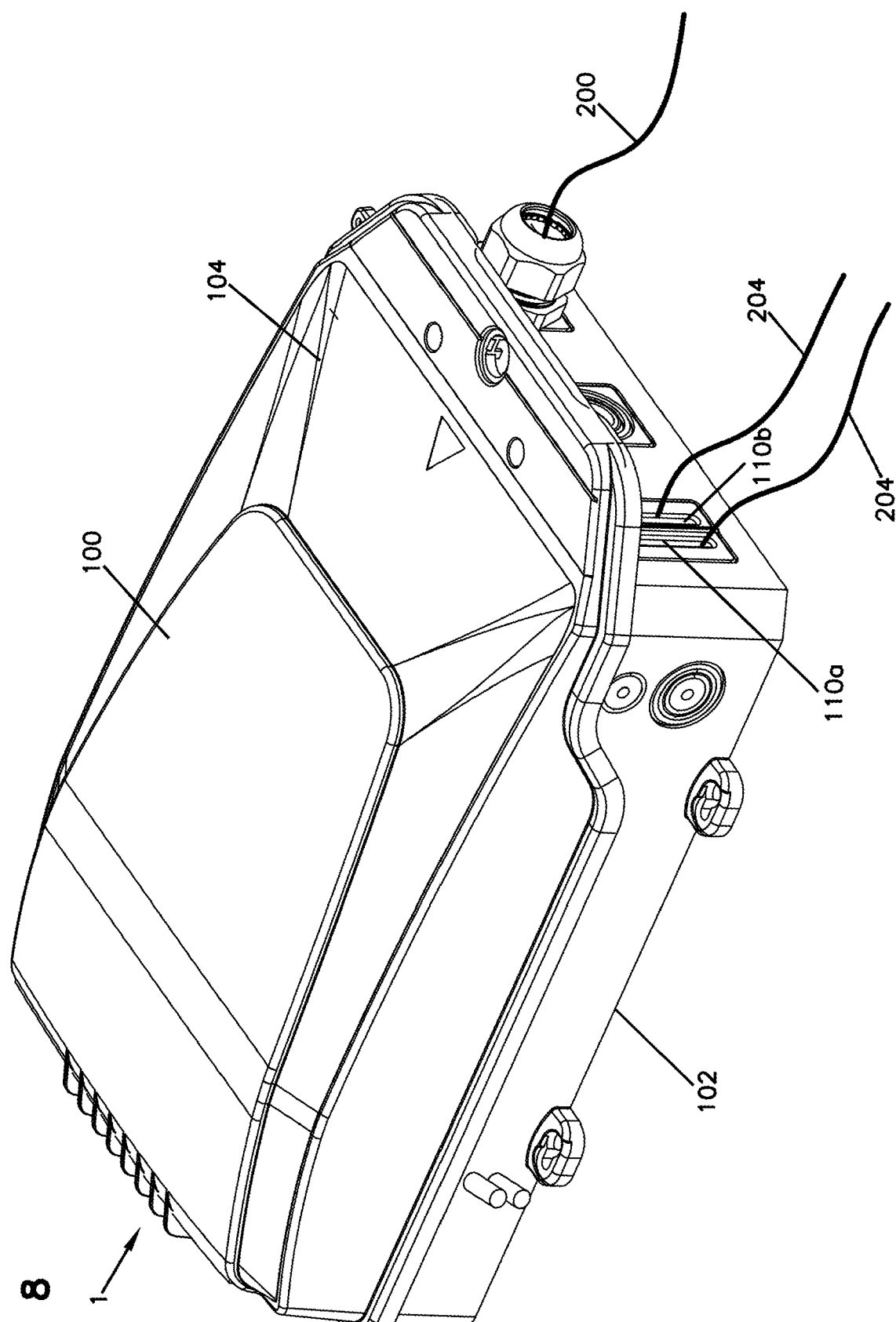
FIG. 8 is a perspective view of a fiber distribution system including the telecommunications enclosure shown in FIG. 1.
Figure 9:
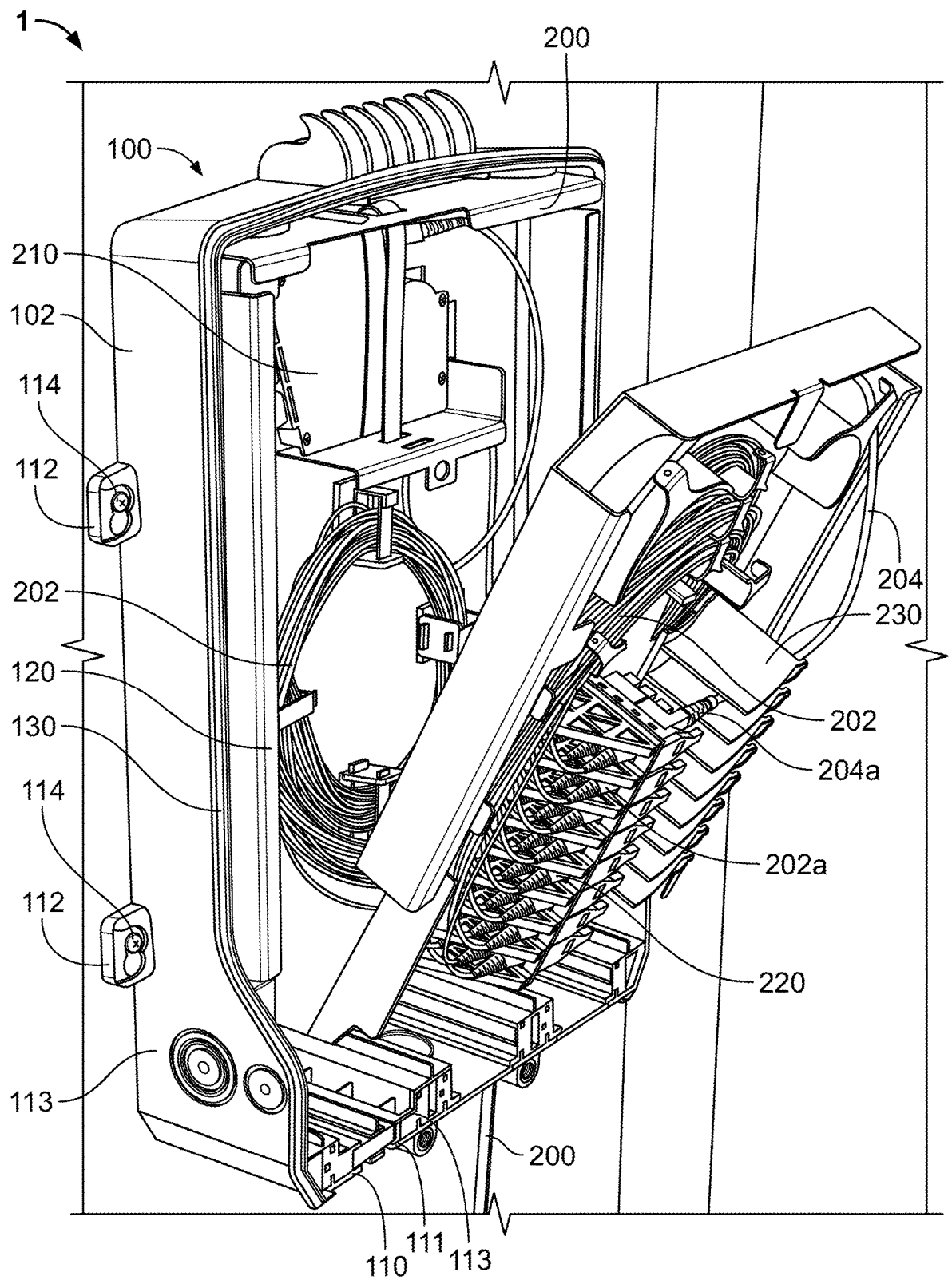
FIG. 9 is a perspective view of the fiber distribution system shown in FIG. 8 with the cover removed from the telecommunications enclosure and with the second tray in an outwardly pivoted position.
Figure 10:
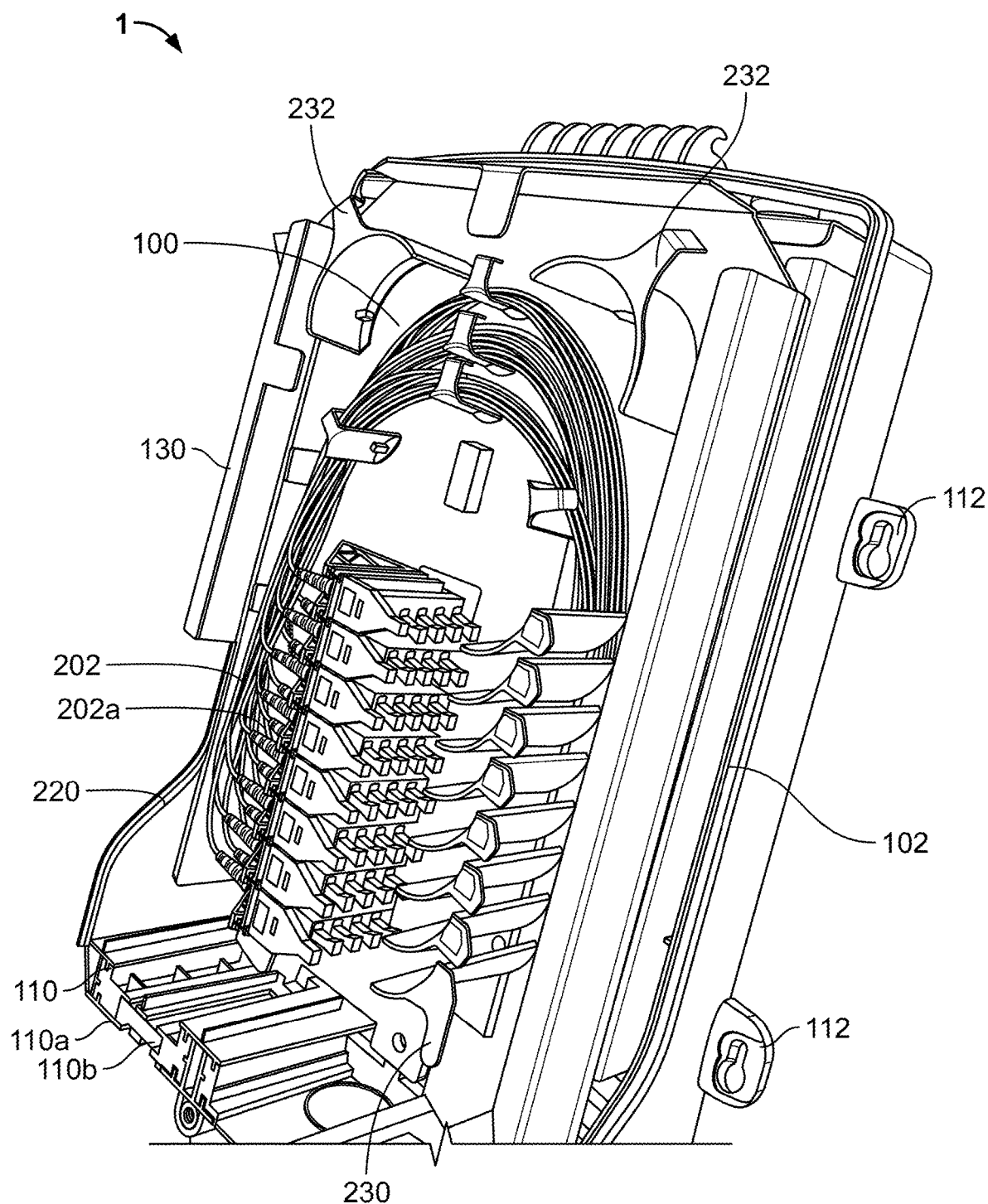
FIG. 10 is a perspective view of the fiber distribution system shown in FIG. 8 with the cover removed from the telecommunications enclosure and with the second tray in a rested position.
Figure 11:
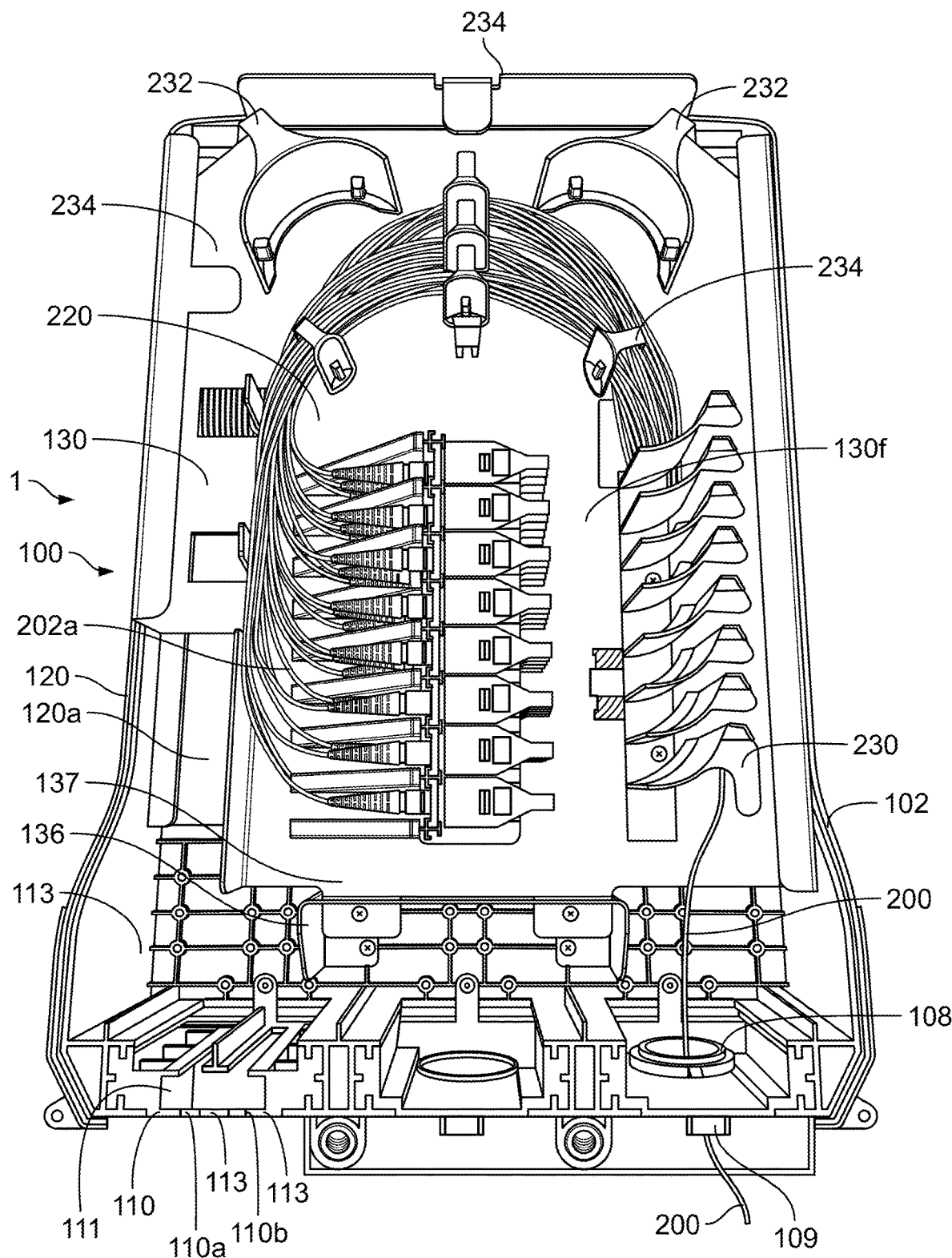
FIG. 11 is a front perspective view of the fiber distribution system shown in FIG. 8 with the cover removed from the telecommunications enclosure.
Figure 12:
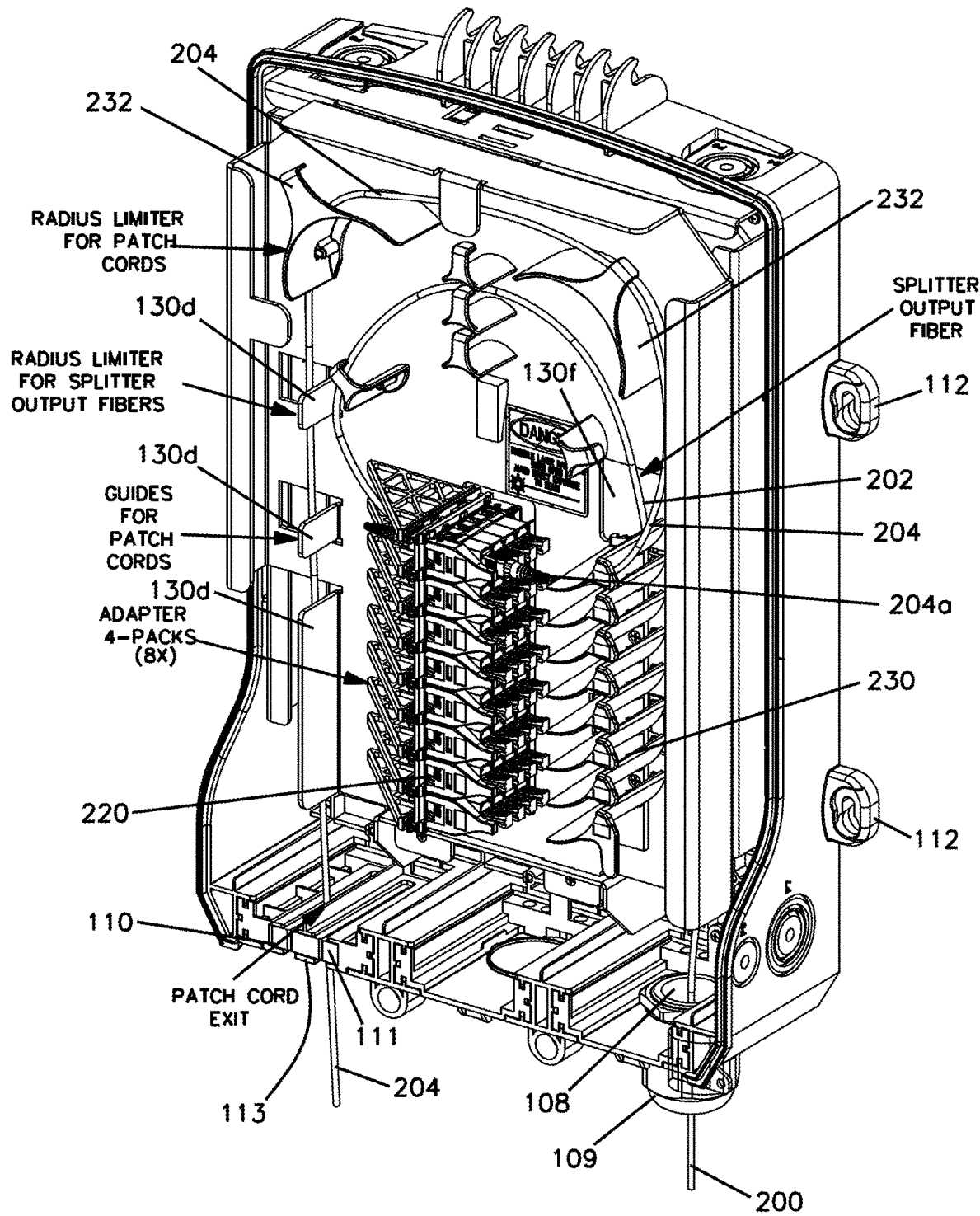
FIG. 12 is a perspective view of the fiber distribution system shown in FIG. 8 showing details of the cable routing pathways.
Figure 13:
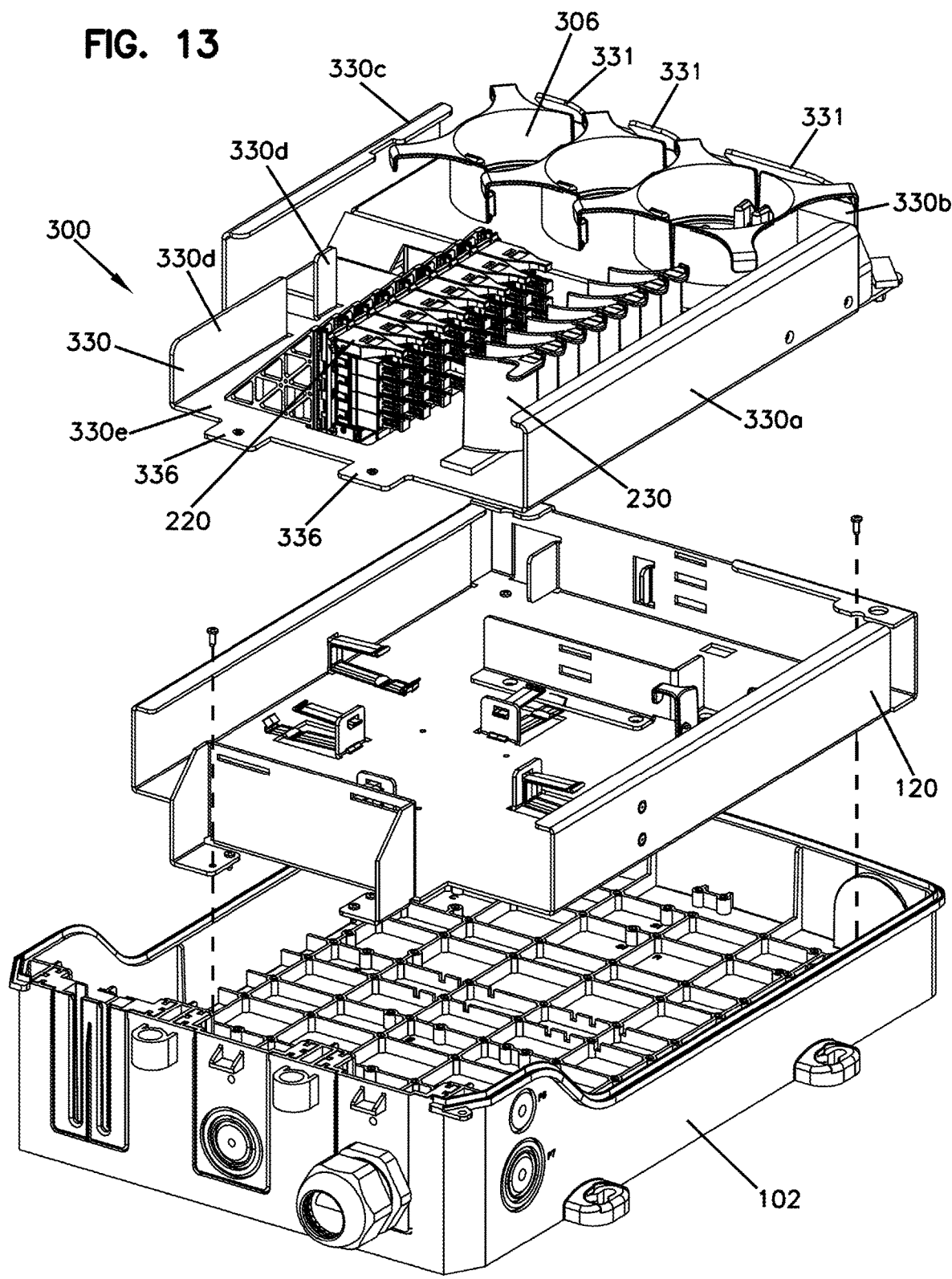
FIG. 13 is a partial exploded perspective view of another embodiment of a telecommunications enclosure and fiber distribution system including a slack storage system for the distribution cables, the embodiment having features and aspects in accordance with the present disclosure.
Figure 14:
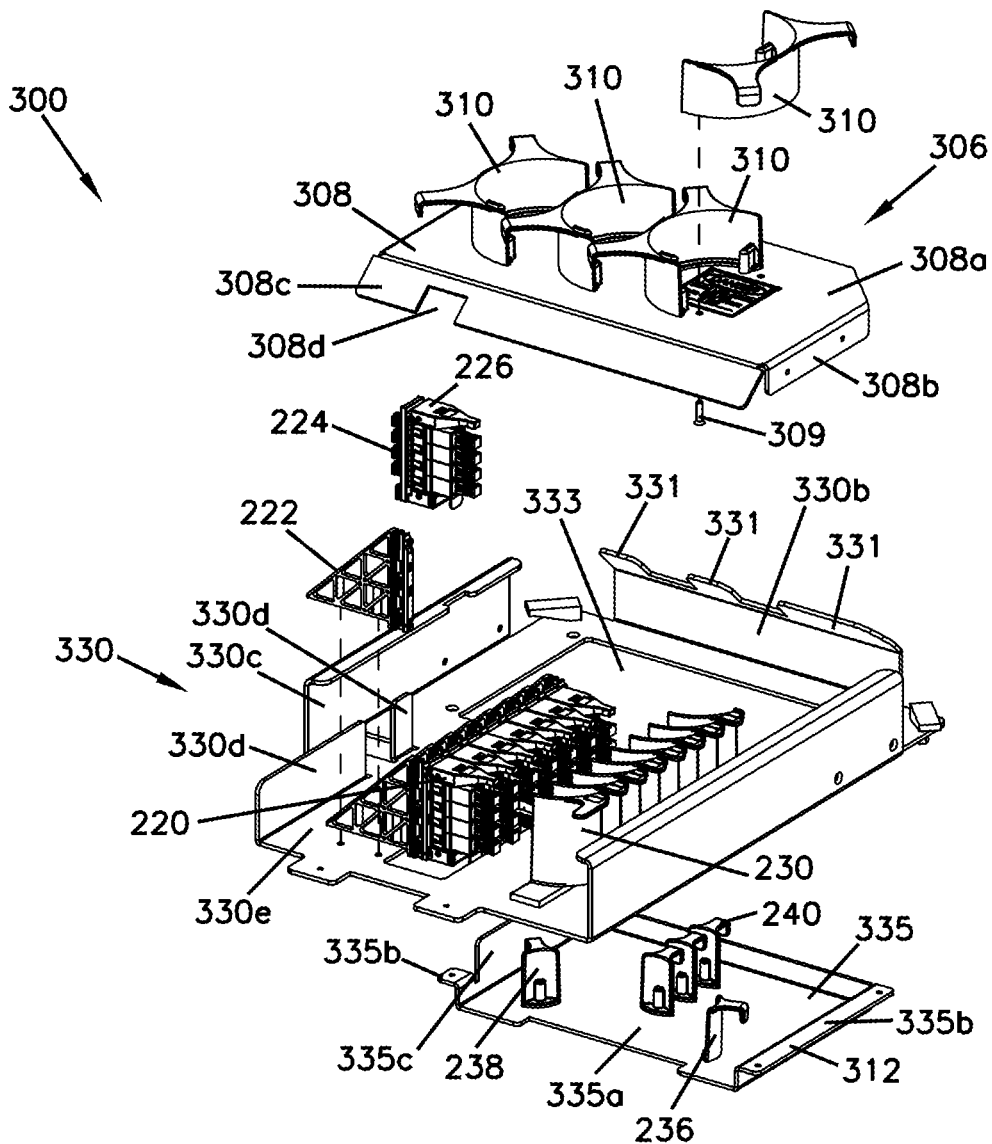
FIG. 14 is an exploded view of the telecommunications enclosure shown in FIG. 13.
Figure 14:
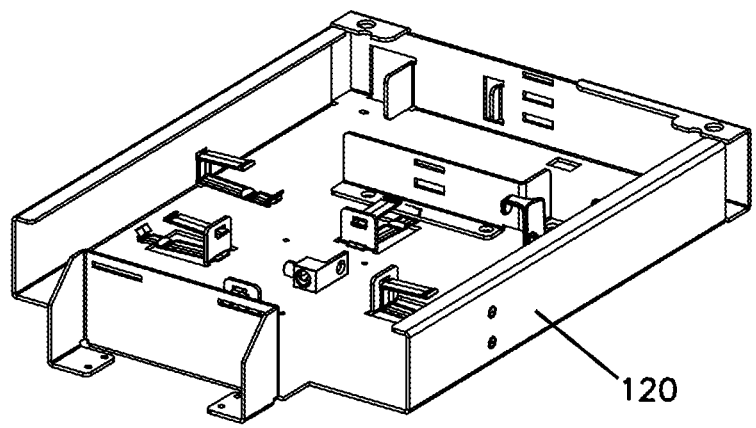
Figure 15:
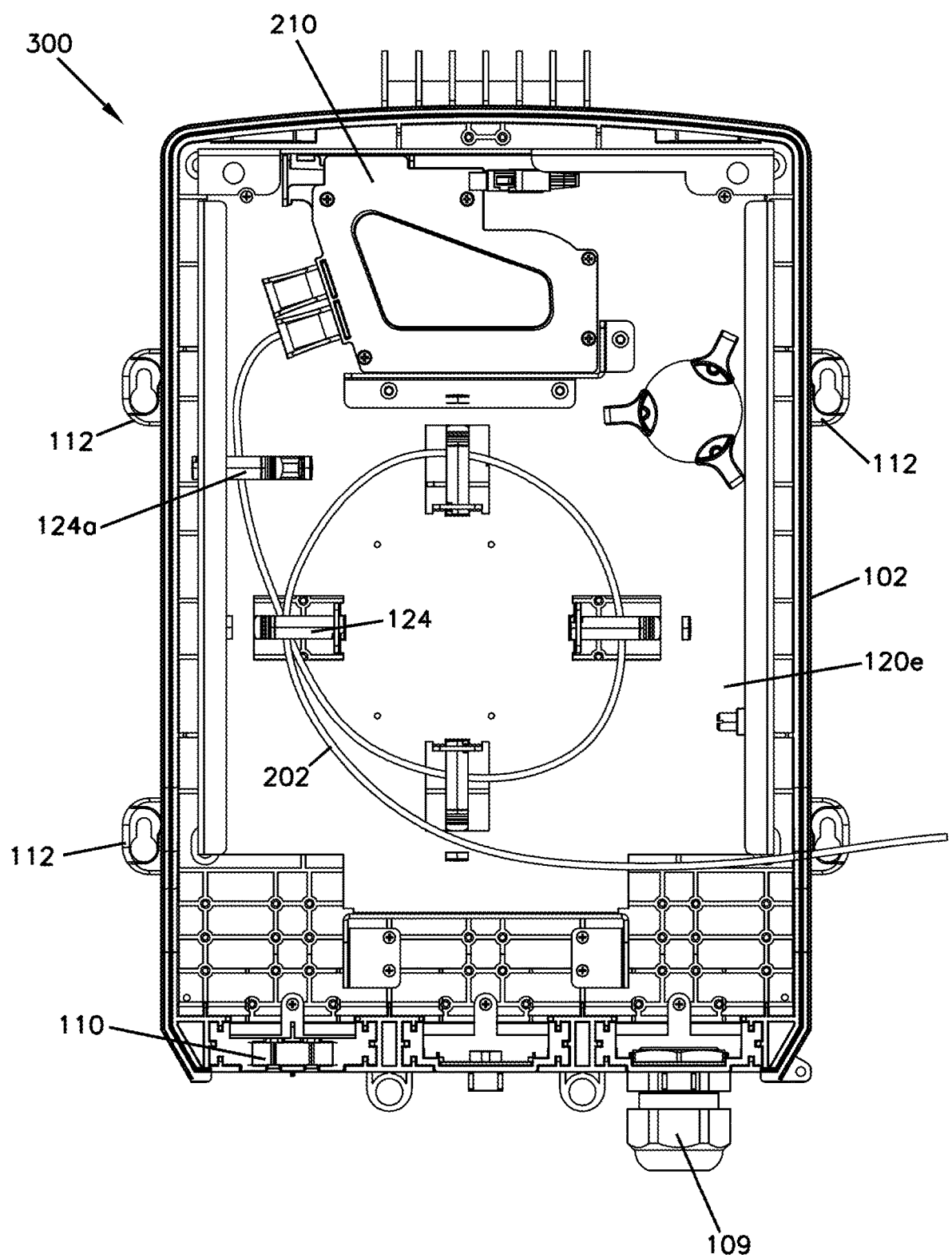
FIG. 15 is a front view of the fiber distribution system shown in FIG. 13 with the cover and a second tray removed.
Figure 16:
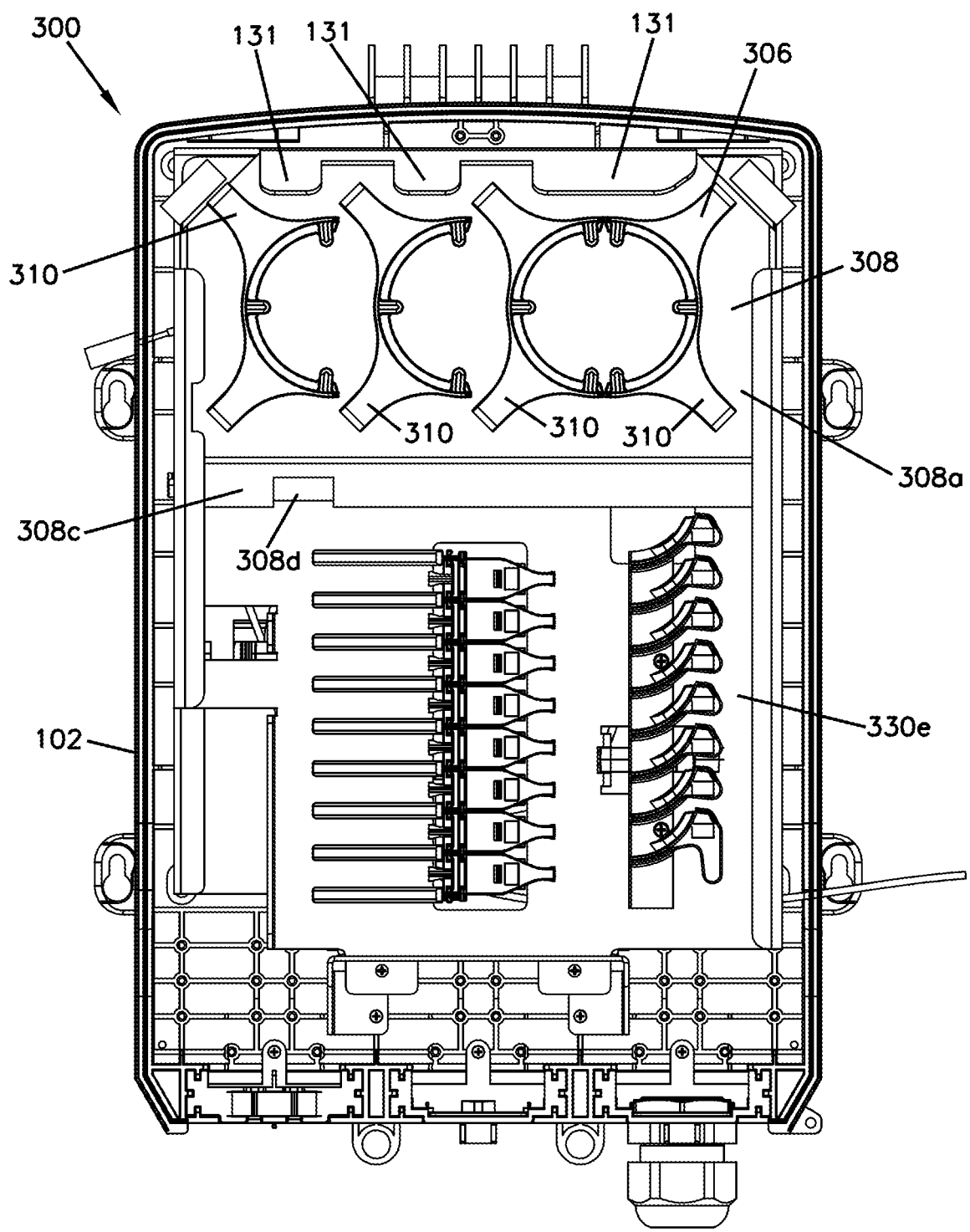
FIG. 16 is a front view of the fiber distribution system shown in FIG. 13 with the cover removed to show the telecommunications enclosure.
Figure 17:
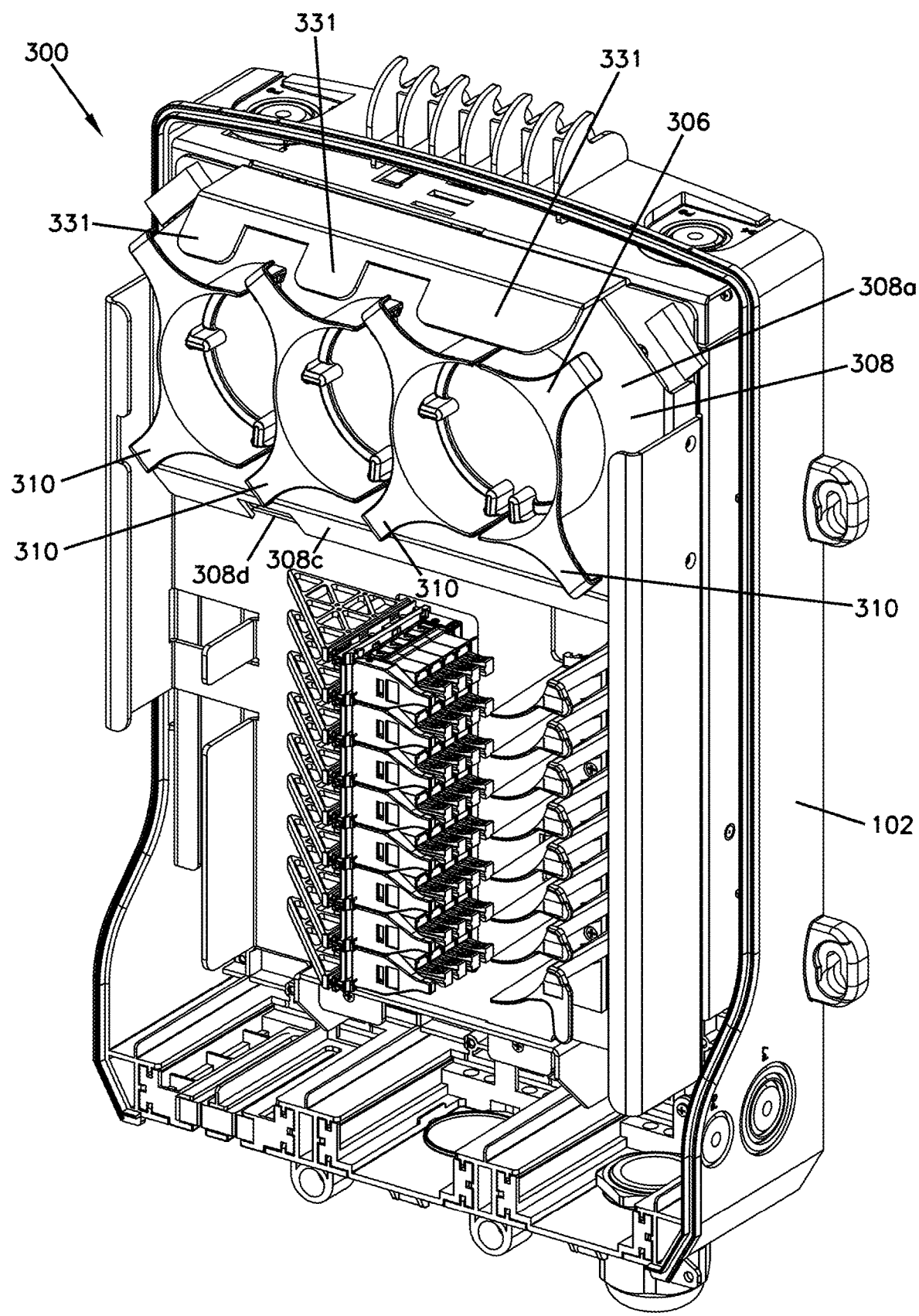
FIG. 17 is a perspective view of the fiber distribution system shown in FIG. 13 with the cover removed to show the telecommunications enclosure.
Figure 18:
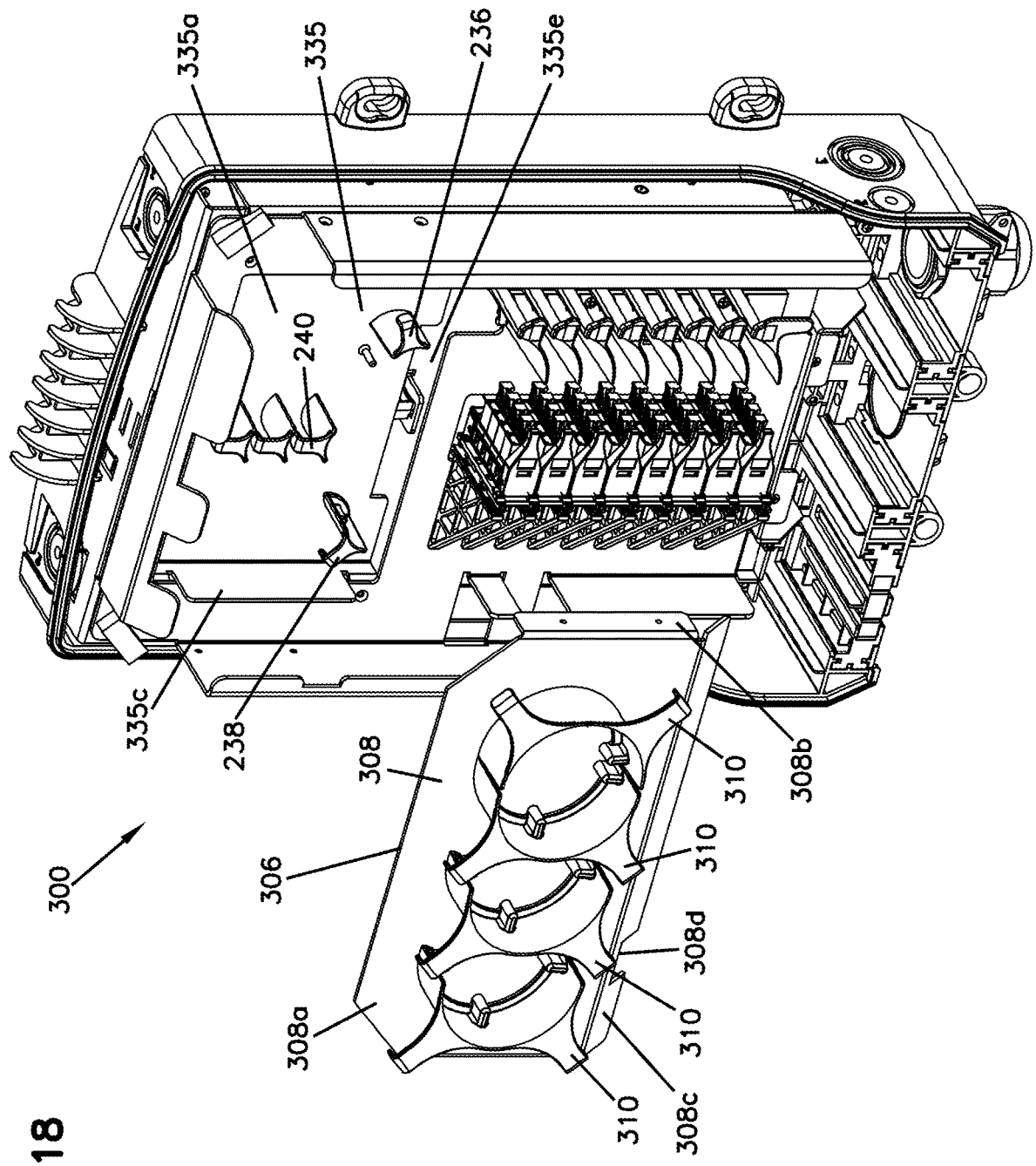
FIG. 18 is a perspective view of the fiber distribution system shown in FIG. 13 with the cover removed to show the telecommunications enclosure and with a portion of the slack management system shown detached from the telecommunications enclosure.
Figure 19:
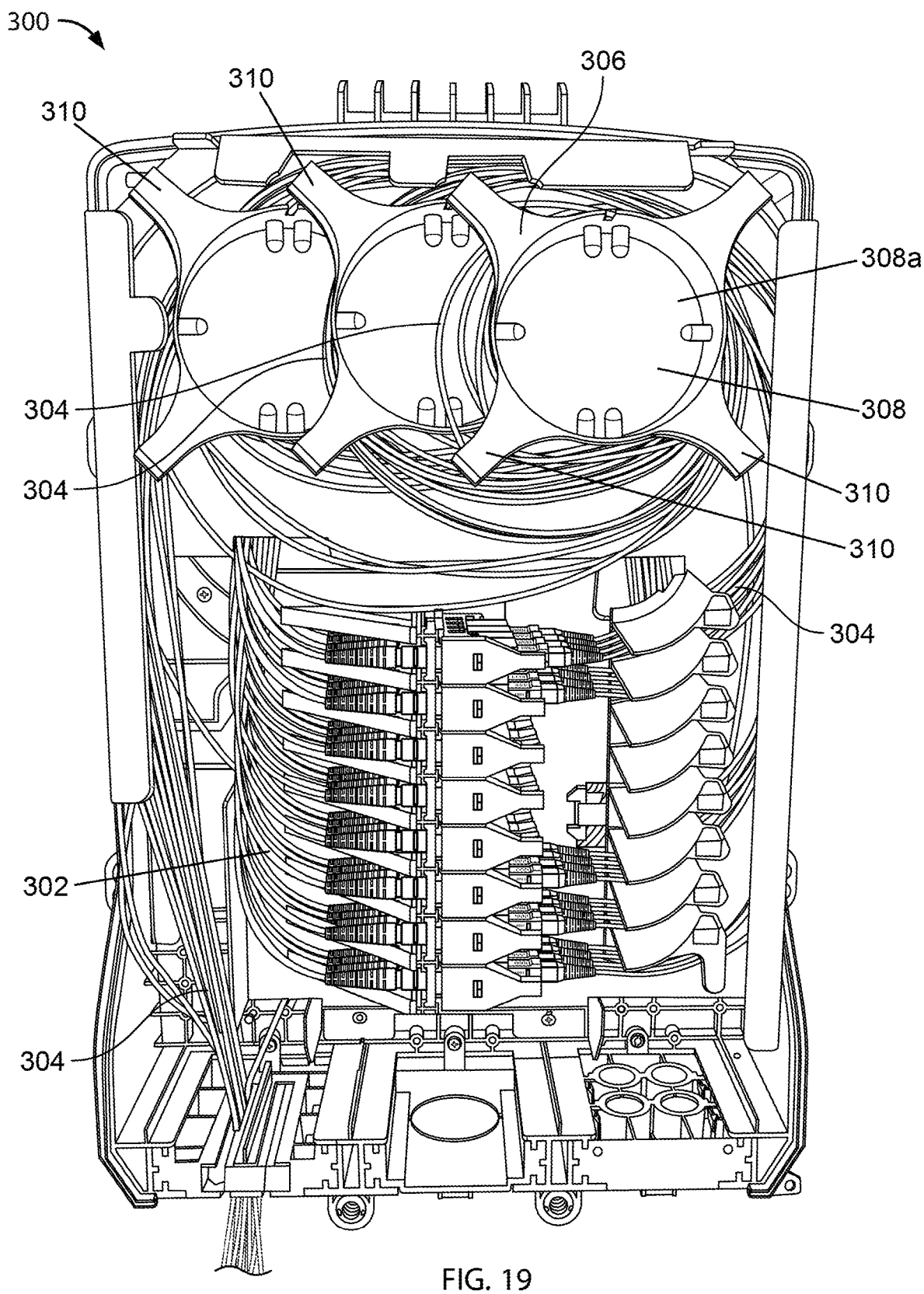
FIG. 19 is a front view of the fiber distribution system shown in FIG. 13 with the cover removed to show the telecommunications enclosure and with telecommunications cables routed therein.

The first tray 120 is also shown as being provided with a pair of slots 126 in the wall 120a. The slots 126 are shaped to receive corresponding tabs 136 of the second tray 130 and allow for a pivotal connection between the first tray 120 and the second tray 130. The width of the slots 126 is such that the rotation of the tabs 136, and thus the tray 130, is limited to a maximum outward position. FIGS. 7 and 9 show this maximum position with the enclosure 100 mounted to a wall such that the slots 126 and tabs 136 are proximate the bottom of the enclosure 100. In this configuration, the second tray 130 is held in the outwardly pivoted position by gravity. It is noted that the second tray 130 can be removed from the first tray 120 and enclosure 100 by simply pulling the second tray 130 away from the first tray 120 such that the tabs 136 are removed from the slots 126. In a folded or storage position, the second tray 130 is rotated against the first tray 120 and secured to the first tray 120 via the latch 131. In this position, the second tray 130 is prevented from moving away from wall 120a such that the tabs 136 are prevented from being removed from the slots 126. As such, it is the combination of the tabs 136 (and slots 126) and the latch 131 that secure the second tray 130 to the first tray 120. If desired, a securing element 137 can be installed onto the tabs 136 to prevent removal of the tabs 136 from the slots 126. In the embodiment shown, the securing element 137 is a threaded screw.

The second tray 130 is also provided with sidewalls 130a, 130b, 130c, and 130d which extend outwardly from a back wall 130e. These sidewalls and back wall 130e can be formed from an initially flat sheet of material and subsequently cut and bent to form the sidewall features. For example, the sidewalls 130d can be configured as cut-away portions of the back wall 130e that are bent upwardly to form the sidewalls. As shown, the previously discussed tabs 136 are an extension of the back wall 130e. The second tray 130 is also provided with an aperture 130f in the back wall 130e for allowing the splitter cables 202 to extend from the first tray 120 and into the second tray 130.

The second tray 130 is configured to retain a number of telecommunications components. For example, the back wall 130e of the second tray 130 is configured to accept a termination location 220. The termination location 220 is for placing the optical fibers of the splitter cables 202 in optical communication with the optical fibers of the patch cords or cables 204. In the embodiment shown, the termination location 220 is bank of sliding adapter packs configured to connect to connectors 202a of the splitter cables 202 and to connect to connectors 204a of the cables 204. The bank of sliding adapter packs 220 includes a plurality of guide walls 222 secured to the back wall 130e and a plurality of sliding termination blocks 224 having multiple adapter modules 226. Each of the sliding termination blocks 224 is located between and is slidably connected to a pair of guide walls 222 such that the termination blocks 224 can be raised and lowered away from and towards the back wall 130e. Examples of termination locations 220 suitable for the disclosed enclosure 100 and system 1 are described and shown in U.S. Pat. Nos. 6,591,051 and 5,497,444 the entireties of each being incorporated by reference herein. As shown, eight termination blocks 224 each having four adapters 226 are provided that are supported by nine guide walls 222. However, more or fewer termination blocks 224, adapters 226, and guide walls 222 may be provided for any given application. Alternatively, the termination locations can be stationary.

The second tray 130 may also be provided with bend radius limiters 230 for guiding the patch cables 204 from the termination location 220 and directing the cables 204 in a direction generally parallel to the sidewall 130a. As shown, a bend radius limiter 230 is provided for each termination block 224 such that an array of eight bend radius limiters 230 is provided. The second tray 130 may be provided with additional bend radius limiters 232 for further guiding the cables 204 towards the sidewall 130c at which the cables 204 are guided between the sidewall 130c and the sidewalls 130d towards the second opening 110. Accordingly, the bend radius limiters 230, 232 and the sidewalls 130a, 130b, 130c, 130d define a cable routing passageway for the cables 204.

The second tray 130 may be further provided with bend radius limiters 236, 238, 240 for guiding the splitter cables 202 as the cables 202 exit the aperture 130f and extend to the termination location 220. The sidewalls 130d also act to guide the patch cords or splitter cables 202 and additionally function to keep the splitter cables 202 separated from the patch or output cables 204. The sidewalls 130d can also act as bend radius limiters.

Referring now to FIGS. 13-19, an alternative enclosure 300 is shown. Many of the features of enclosure 300 are similar to the features of enclosure 100. Thus, the previous description for the first embodiment is largely applicable to the description of enclosure 300. To the extent that the embodiments are similar, the description will not be repeated and will instead be directed to the primary differences. Also, it is noted that the cover 104 is not shown in FIGS. 13-19, but is similar to that shown at FIG. 1. In general, the main body 102, the cover 104, and first tray 120 are the same between the two embodiments 100, 300. However, enclosure 300 differs in that the second tray 130 has a different configuration. Namely, the enclosure 300 has a distribution cable slack storage system 306 for managing cables 304 instead of bend radius limiters 232. For the second tray of enclosure 300, the features will be similarly numbered for tray 130, but will be in the 300 series (i.e. 330 instead of 130).

As shown, the second tray 330 is provided with an aperture 333 located within the back wall 330e and between wall 330b and the termination location 220 and bend radius limiters 230. This location corresponds to the location where the bend radius limiters 232, 236, 240, and 238 are located on the second tray 130. The second tray 330 is additionally provided with a recessed frame 335 which mounts to the back wall 330e and covers the aperture 333. In the embodiment shown, the frame 335 is mounted to the back wall 330e at support walls 335a of the frame 335 with mechanical fasteners, such as screws. The bend radius limiters 236, 238, and 240 are mounted to a support surface 335 of the frame 335, and thus extend through the aperture 333. As the frame 335 is recessed in height, the bend radius limiters 236, 238, and 240 are mounted below the level of the back wall 330e and are disposed at a lower height in comparison to their position within second tray 130. This reduced height can allow for sufficient room for the cable slack storage system 306 to be installed directly above while still fitting within the main body and cover 102, 104. In an alternative construction, the back wall 330e could be formed with an integral recessed tray and/or the bend radius limiters 236, 238, 240 could be provided with a reduced height albeit with a lower storage capacity. The lower elevation of the support surface 335a can also enlarge or create an opening 335e into the first tray 120 and thereby allows cables to be routed between the first tray 120 and the bend radius limiters 236, 238, 240. The removable frame 335 is advantageous in that multiple tray configurations could be developed to allow for a modular construction approach wherein a frame 335 constructed for a particular application can be chosen without requiring the entire second tray 330 to be redesigned.

The cable slack storage system 306 is shown as being provided with a frame 308 having a support surface 308a, wherein the frame 308 is mounted to the second tray 330. In the embodiment shown, sidewalls 308b of the frame 308 are mounted to the sidewalls 330a, 330c with mechanical fasteners, such as screws. The frame 308 further includes a sloped front wall 308c which includes a notch or aperture 308d. The sloped wall 308c enables for a smooth transition area for cables traversing from along the back wall 330e to the support surface 308a which is elevated relative to the back wall 330e. The notch 308d provides for a passageway for cables routed about the bend radius limiters 236, 238, 240 to extend into and out of the enclosed space defined between the support surfaces 335a, 308a, sidewall 330b, and front wall 308c. A sidewall 335c of the frame 335 is provided that is aligned at one side of the notch 308d to further define the enclosed space. The sidewall 335c can also act as a guide for the cables extending through the notch 308d. The frame 308 is removable and can therefore be removed during the routing of the cables about bend radius limiters 236, 238, 240 and later installed after routing is complete.

The cable slack management system 306 also includes one or more bend radius limiters 310 to enable cable slack storage for cables 304 internal to enclosure 300. As shown, the radius limiters 310 are mounted to the support surface 308a of the frame 308 and are attached by mechanical fasteners, such as screws 309. In the example shown, three similarly oriented semi-circular radius limiters 310 are provided with a fourth semi-circular radius limiter 310 being provided at one end to form a fully circular radius limiter assembly with another limiter 310. Other configurations are possible. To further aid in guiding and retaining the cables about the radius limiters 310, the back wall 330b can be additionally provided with slanted extensions 331 which extend towards the bend radius limiters 310 and partially cover the open space defined between the back wall 330b and the limiters 310. The removable frame 308 is advantageous in that multiple cable management configurations could be developed to allow for a modular construction approach wherein system 306 constructed for a particular application can be chosen without requiring the entire second tray 330 to be redesigned.

While this invention has been particularly shown and described with references to preferred embodiments thereof, it will be understood by those skilled in the art that various changes in form and details may be made therein without departing from the scope of the invention encompassed by the appended claims. The drawings are not necessarily to scale, emphasis instead being placed upon illustrating the principles of the invention and other modifications within the scope. Any such modifications or variations that fall within the purview of this description are intended to be included therein as well. It is understood that the description herein is intended to be illustrative only and is not intended to be limitative.

What is claimed is:

1. A telecommunications enclosure comprising:
a) a main body and a cover that together define an interior cavity;
b) a first tray removably mountable within the interior cavity, the first tray including:
   i) an optical splitter mounting location to which one or more optical splitters can be mounted;
c) a second tray removably mountable to the first tray, the second tray including:
   i) a termination mounting location to which optical adapters can be secured;
   ii) an aperture extending through a wall of the second tray;
d) a cable routing passageway extending between the termination mounting location and the splitter mounting location, the cable routing passageway extending through the aperture.

2. The telecommunications enclosure of claim 1, wherein the second tray is pivotally mounted to the first tray.

3. The telecommunications enclosure of claim 2, wherein the second tray includes at least one tab extension that is received into a slot of the first tray.

4. The telecommunications enclosure of claim 3, wherein the second tray includes a first lock feature for securing the at least one tab extension in the slot.

5. The telecommunications enclosure of claim 1, wherein one or both of the first and second trays includes a plurality of cable management clips.

6. The telecommunications enclosure of claim 1, wherein the cable routing passageway includes at least one bend radius limiting element.

7. The telecommunications enclosure of claim 1, wherein the first and second trays are each formed from an initially flat sheet of metal.

8. The telecommunications enclosure of claim 1, wherein the main body and cover are molded plastic components.

9. The telecommunications enclosure of claim 1, wherein the main body is provided with mounting lugs for mounting the enclosure to a surface.

10. The telecommunications enclosure of claim 1, further comprising:
a) a first frame mounted to the second tray that at least partially covers the aperture, the first frame including at least one bend radius limiter for supporting optical fibers.

11. The telecommunications enclosure of claim 10, further comprising:
a) a cable slack management frame mounted to the second tray directly above the first frame, the cable slack management frame including a plurality of bend radius limiters for supporting splitter outputs and/or the optical cables.

12. The telecommunications enclosure of claim 1, further comprising:
a) a cable slack management frame mounted to the second tray directly above the aperture, the cable slack management frame including a plurality of bend radius limiters for supporting splitter outputs and/or optical cables.

13. A telecommunications enclosure comprising:
a main body and a cover that together define an interior cavity;
a first tray removably mountable within the interior cavity, the first tray including:
   an optical splitter mounting location to which one or more optical splitters can be mounted;
a second tray removably mountable to the first tray, the second tray including:
   a termination mounting location to which optical adapters can be secured;
   an aperture extending through a wall of the second tray;
   a cable routing passageway extending between the termination mounting location and the splitter mounting location, the cable routing passageway extending through the aperture;
wherein the termination location includes a plurality of sliding adapter packs including a plurality of optical adapters.

14. The telecommunications enclosure of claim 13, wherein the cable routing passageway includes a plurality of first bend radius limiting elements, each of which is aligned with one of the plurality of sliding adapter packs.

15. A telecommunications enclosure comprising:
 a) a main body and a cover that together define an interior cavity;
 b) a first tray removably mountable within the interior cavity, the first tray supporting an optical splitter;
 c) a second tray removably mountable to the first tray, the second tray supporting optical adapters and including an aperture extending through a wall of the second tray;
 d) a plurality of cables extending between the optical adapters and the splitter location, the plurality of cables extending through the aperture.

16. The fiber optic distribution system of claim 15, further including sliding adapter packs including the optical adapters.

17. The fiber optic distribution system of claim 15, wherein the second tray is pivotally mounted to the first tray.

18. The fiber optic distribution system of claim 17, wherein the second tray includes at least one tab extension that is received into a slot of the first tray.

19. The fiber optic distribution system of claim 18, wherein the second tray is secured to the first tray by a first lock mechanism and a by a pivotal connection point between the first and second trays.

20. The fiber optic distribution system of claim 15, further comprising slack storage for the plurality of cables.

\* \* \* \* \*

UNITED STATES PATENT AND TRADEMARK OFFICE
CERTIFICATE OF CORRECTION

PATENT NO. : 10,732,369 B2  
APPLICATION NO. : 16/420717  
DATED : August 4, 2020  
INVENTOR(S) : Matthew J. Holmberg et al.

Page 1 of 1

It is certified that error appears in the above-identified patent and that said Letters Patent is hereby corrected as shown below:

In the Claims

Column 9, Line 12, Claim 16: "fiber optic distribution system" should read --telecommunications enclosure--

Column 9, Line 15, Claim 17: "fiber optic distribution system" should read --telecommunications enclosure--

Column 9, Line 17, Claim 18: "fiber optic distribution system" should read --telecommunications enclosure--

Column 9, Line 20, Claim 19: "fiber optic distribution system" should read --telecommunications enclosure--

Column 9, Line 24, Claim 20: "fiber optic distribution system" should read --telecommunications enclosure--

Signed and Sealed this  
Twenty-seventh Day of April, 2021

Drew Hirshfeld  
*Performing the Functions and Duties of the*  
*Under Secretary of Commerce for Intellectual Property and*  
*Director of the United States Patent and Trademark Office*